(12) United States Patent
Malkin et al.

(10) Patent No.: US 9,342,436 B2
(45) Date of Patent: *May 17, 2016

(54) CAPTURE AND DISPLAY OF HISTORICAL RUN-TIME EXECUTION TRACES IN A CODE EDITOR

(71) Applicant: International Business Machines Corporation, Armonk, NY (US)

(72) Inventors: Peter K. Malkin, Yorktown Heights, NY (US); Jacquelyn A. Martino, Cold Spring, NY (US); Clifford A. Pickover, Yorktown Heights, NY (US); Danny Soroker, Larchmont, NY (US); Justin D. Weisz, Stamford, CT (US)

(73) Assignee: International Business Machines Corporation, Armonk, NY (US)

( * ) Notice: Subject to any disclaimer, the term of this patent is extended or adjusted under 35 U.S.C. 154(b) by 13 days.

This patent is subject to a terminal disclaimer.

(21) Appl. No.: 13/963,711

(22) Filed: Aug. 9, 2013

(65) Prior Publication Data

US 2014/0282388 A1 Sep. 18, 2014

Related U.S. Application Data

(63) Continuation of application No. 13/837,430, filed on Mar. 15, 2013.

(51) Int. Cl.
*G06F 9/44* (2006.01)
*G06F 11/36* (2006.01)
*G06F 11/00* (2006.01)

(52) U.S. Cl.
CPC .............. *G06F 11/3636* (2013.01); *G06F 8/30* (2013.01)

(58) Field of Classification Search
CPC ..... G06F 11/30; G06F 11/34; G06F 11/3466; G06F 11/3476; G06F 11/3612; G06F 11/3636; G06F 2201/865
USPC ............................ 717/125, 128; 714/45, 47.3
See application file for complete search history.

(56) References Cited

U.S. PATENT DOCUMENTS

| 5,140,671 | A | 8/1992 | Hayes et al. |
| 6,854,073 | B2 | 2/2005 | Bates et al. |
| 7,383,538 | B2 * | 6/2008 | Bates et al. ................. 717/128 |

(Continued)

OTHER PUBLICATIONS

Anonymous, "A method for automatically changing a variable's value and its side-effected variables' values during debugging," IPCOM000207574D, Jun. 2011, 5pg.*

(Continued)

*Primary Examiner* — Ryan Coyer
(74) *Attorney, Agent, or Firm* — Scully, Scott, Murphy & Presser, P.C.; Nidhi G. Kissoon

(57) ABSTRACT

A program code execution is monitored. Variable type and value information the one or more variables in the program code take during the execution of the program code are stored, and compiled over multiple execution of the program code as historical run-time execution traces. A code editor user interface may present the historical run-time execution traces for inspection, whether or not the program code is currently executing. Statistical properties associated with the variable type and value information may be computed. Future variable type and value the one or more variables might take during future execution of the program code may be predicted.

10 Claims, 4 Drawing Sheets

(56) References Cited

U.S. PATENT DOCUMENTS

| | | | |
|---|---|---|---|
| 7,739,664 B2* | 6/2010 | Bates et al. | 717/127 |
| 8,051,408 B1* | 11/2011 | Johnson | 717/125 |
| 8,090,989 B2* | 1/2012 | Law et al. | 714/35 |
| 2008/0115109 A1* | 5/2008 | Bostick et al. | 717/125 |
| 2008/0301417 A1* | 12/2008 | Law et al. | 712/227 |
| 2011/0321007 A1* | 12/2011 | Marum et al. | 717/113 |

OTHER PUBLICATIONS

IBM, "Interaction method for setting and disabling variable breakpoints," IPCOM000015096D, Jun. 2003, 3pg.*

Anonymous, "Method and system for dynamic on-demand comprehensive tracing in Java Virtual Machine," IPCOM000220142D, Jul. 24, 2012, 6pg.*

* cited by examiner

```
/**
 * @param str The string in which to count spaces.
 * @return The number of spaces in the string.
 */
public static int countSpaces(String str) {
    int count = 0;

for ( int i = 0; i < str.length(); i++ ) {
        if ( str.charAt(i) == ' ' ) {
            count++;
        }
    } return count;
} public static int computeHash(Object obj) {
    if ( obj instanceof String ) {
        return obj.hashCode();
    } else if ( obj instanceof Integer ) {
        return ((Integer) obj).intValue();
    } else {
        return 0;
    }
}
```

Object obj - StringUtilities.computeHash(Object)
Execution on 6/29/2012 at 10:23:46 AM
Sample values and types of "obj":
 "foo" (String), "bar" (String), "baz" (String)
Recent values
 call from Morpher.morph() with value: "foo" (String)
 call from Stepper.setStep() with value: "bar" (String)
 call from Magic.swizzle() with value: "baz" (String)
 see more
Statistics
 StringUtilities.computeHash() called 22 times
 Most common type of "obj" was String
 Mean length: 3
 Minimum length: 3
 Maximum length: 6

Press 'F2' for focus

FIG. 3

CAPTURE AND DISPLAY OF HISTORICAL RUN-TIME EXECUTION TRACES IN A CODE EDITOR

CROSS-REFERENCE TO RELATED APPLICATIONS

This application is a continuation of U.S. Ser. No. 13/837,430, filed on Mar. 15, 2013, the entire content and disclosure of which is incorporated herein by reference.

BACKGROUND FIELD

The present application relates generally to computers, and computer applications, and more particularly to computer programming editors, development environment and debugging tools.

BACKGROUND

In programming, not knowing the types or contents of variables exacerbates the difficulty in writing a program code. This may occur in dynamically-typed languages like JAVASCRIPT™, in which a variable's type is not clear from its definition, or in statically-typed languages like JAVA™, in which one may know that a variable is a string, but not know what the content of that string is supposed to be. These problems make it difficult for programmers to reason about and extend code written by others, or even code written by them and forgotten.

A known software debug program displays the flow of a program being debugged to a user. The program flow is illustrated in an example by highlighting the locations of sequential calls within the program being debugged, on a program structural representation which is presented on a display screen. In one example, a user is selectively able to stop the debug program at any observed step within the displayed flow sequence, to make programming changes or take another action as may be appropriate. In the example, the debug program user is also able to select an automatic sequencing through the flow of a program being developed and to designate a preferred display time duration for each step of the displayed sequencing.

BRIEF SUMMARY

A method to capture historical run-time execution traces, in one aspect, may comprise obtaining an identification of a program code comprising one or more variables whose variable type and value information are to be captured. The method may also comprise monitoring an execution of the program code. The method may further comprise storing the variable type and value information the one or more variables take during the execution of the program code, wherein the monitoring and the storing are repeated for a plurality of executions of the program code, wherein the stored variable type and value information for each of the plurality of executions of the program code are compiled as the historical run-time execution traces. The method may further comprise presenting one or more of the variable type and value information without needing the program code to execute while the variable type and value information is being presented.

A system for capturing and presenting historical run-time execution traces, in one aspect, may comprise a monitoring unit operable to execute on the processor and further operable to obtain an identification of a program code comprising one or more variables whose variable type and value information are to be captured. The monitoring unit may be further operable to monitor an execution of the program code. The monitoring unit may be further operable to store the variable type and value information the one or more variables take during the execution of the program code, wherein the monitoring unit monitors and stores the variable type and value information for a plurality of executions of the program code, wherein the stored variable type and value information for each of the plurality of executions of the program code are compiled as the historical run-time execution traces. A code editor user interface may be operable to execute on the processor, and further operable to present the compiled historical run-time execution traces whether or not the program code is currently executing and without needing the program code to execute while the variable type and value information is being presented.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

BRIEF DESCRIPTION OF THE SEVERAL VIEWS OF THE DRAWINGS

FIG. 3 shows an example screen shot of a code editor user interface in one embodiment of the present disclosure.

DETAILED DESCRIPTION

Allowing a user to view or inspect historical or projected (e.g., forecasted) values of software variables is disclosed, e.g., when using a program code editor. The values may be viewed or inspected, e.g., during the code execution. The values may be viewed or inspected also when the code is not actually executing. Such features may be provided in the forms of a system, method, and/or programming instructions executable on one or more hardware processors.

In one embodiment of the present disclosure, a system may capture the types and values of variables during the execution of one or more specified blocks of code and store them. During program execution, the system incrementally builds a table, or other affordance. During execution, the system continuously updates the table or the like, for example, by appending the current state of variable types and values and their statistical properties, for example, along with a date and time (referred to as a timestamp) such that a user may scroll backward in time to examine states. In this way, the table or the like is available for user inspection at any point in time whether or not the code is currently executing. After program execution has finished, the system enables a human programmer to inspect the historical types and values of the variables that were captured, as well as their statistical properties and forecasts of predicted future values.

As such, the system of the present disclosure in one embodiment may capture a series of historical traces of variable type and value information and makes that information available offline, after program execution has finished. These traces can be stored, shared, appended to, and viewed inside of a code editor. The system also makes future predictions of the types or values of variables, e.g., by extrapolating from historical information. Other prediction/forecasting algorithms may be employed.

Figure 1:
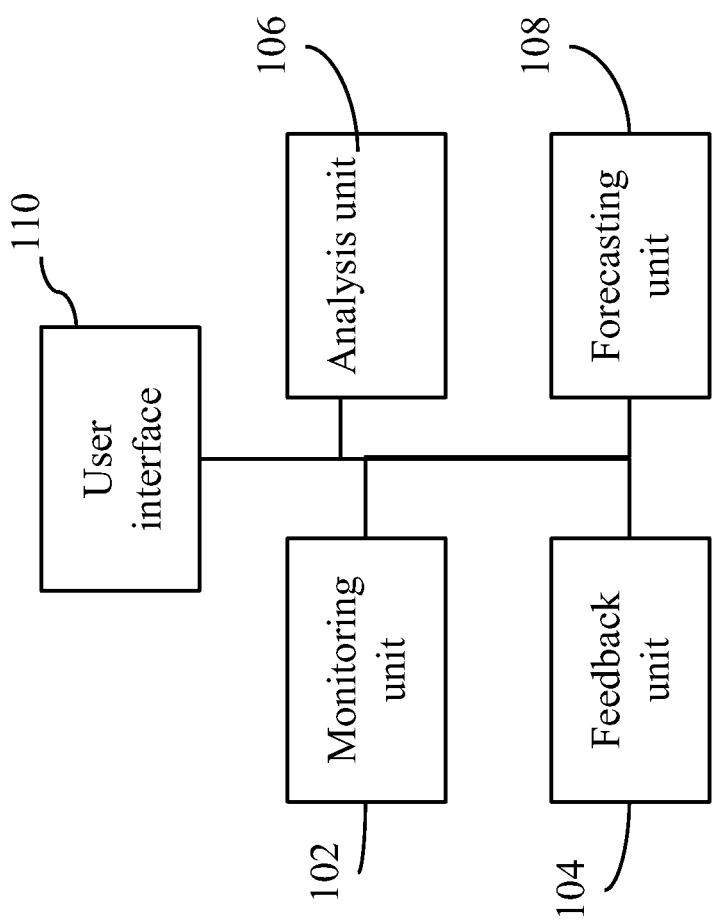
FIG. 1 is a diagram illustrating components of a system for capturing historical run-time execution traces and presenting them in one embodiment of the present disclosure.

FIG. 1 is a diagram illustrating components of a system for capturing historical run-time execution traces and/or presenting them, e.g., displaying and/or otherwise presenting them in an editor or another programming environment in one embodiment of the present disclosure. The one or more components shown in FIG. 1 may execute on one or more computer processors, including for example at least one or more hardware components. A system and/or a methodology in one embodiment of the present disclosure may capture values and types of variables during the execution of specified blocks of code, store them, and recall them at a later time (e.g., when the program is no longer executing) for display to a programmer, e.g., inside of a code editing environment. For instance, before program execution, a programmer may specify a set of source code files to monitor to a monitoring unit 102. This specification may be a set of source code files, or specific classes, methods, or functions. A programmer may explicitly specify these items, or these items may be inferred based upon the programmer's interactions with the system. For example, the monitoring unit may keep track of the source files the programmer currently has open in the editor, has recently edited, typically edits, edited since the last program execution, or has made the most edits to, or it can keep track of the source files that have the most change activity in a source control system, or any one or more combinations thereof.

A feedback unit 104 may be used to search for variables that exhibit anomalous or unusual statistical properties. These variables are reported back to the monitoring unit for monitoring during the next program execution. During program execution, the monitoring unit 102 monitors program execution in the specified or automatically discovered code and/or variables. The monitoring unit 102 maintains a record, e.g., a table of variables and their types, values, locations in code, and timestamps at which the variable was created, modified, or destroyed.

After program execution has finished in one embodiment of the present disclosure, an analysis unit 106 may compute statistical properties for the variables; for example, measures of centrality and dispersion may be computed for integer variables (e.g., mean, standard deviation). A forecasting 108 unit may compute extrapolated values for future potential values the variables may take during future executions of the program. The results from the analysis unit 106 and the forecasting unit 108 may be displayed in the code editor user interface 110 showing the programmer. For example, in response to a programmer hovering the cursor over a variable, the code editor user interface 110 may automatically present (e.g., display in a pop-up screen) one or more of, or any combinations of, the historical types, values, statistical properties, and forecasted future values of that variable.

The programmer may be also enabled to "time-surf" across multiple executions of the program to compare different executions of the program. For instance, multiple presentations, each corresponding to an execution of the program at different times, may be presented to the user. The value of time-surfed variables may show those variables that have assumed values beyond a threshold range, e.g., in an "alert range" (e.g., too high, too low, too much variability).

Figure 2:
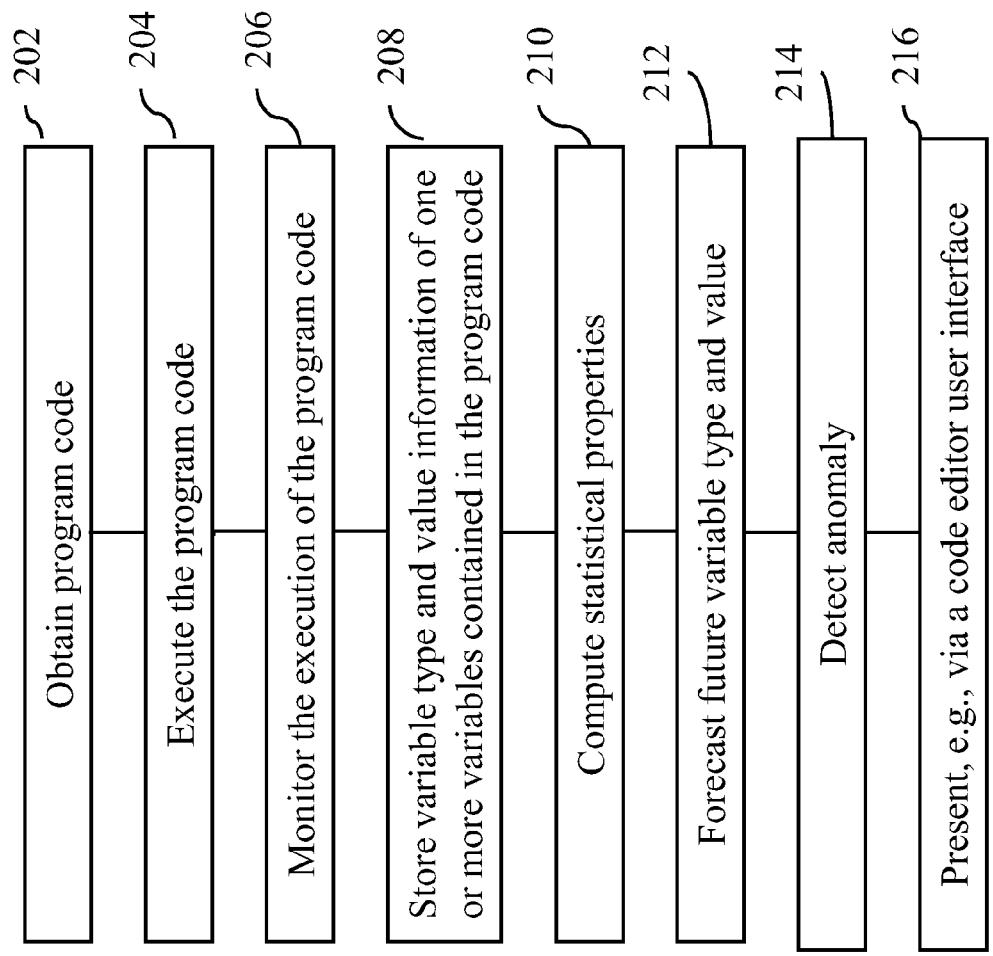
FIG. 2 is a flow diagram illustrating a method of capturing historical run-time execution traces in one embodiment of the present disclosure.

FIG. 2 is a flow diagram illustrating a method of capturing historical run-time execution traces and/or presenting or displaying them in an editor or another programming environment in one embodiment of the present disclosure. At 202, program code or identification thereof (e.g., identification of entire program code, block or portion of program code) in which to capture variable type and value information to monitor is obtained, for example, by a monitoring unit as described above. The code may be specified by a user, e.g., by its name or another identifier, e.g., via an editor tool or the like. For instance, names or identifiers of a program code and/or methods, functions, classes, or another object in a program code may be specified. In another aspect, the specification may be automatic. For example, the entire program (identification) may be obtained for monitoring. As another example, a portion of the code may be automatically discovered, e.g., inferred or learned as discussed above, e.g., by the monitoring unit and an analysis unit based on prior historical traces of program execution that comprises monitored blocks of code containing anomalous data.

At 204, the code is executed on a processor, e.g., a programmer initiates the execution of the code. At 206, the code execution is monitored, e.g., by the monitoring unit. At 208, the type and value information of variables within the specified portion or block of code may be monitored and stored. For example, the types and values for each statement inside the specified portion or block of code, that involves the modification of a variable, and the types and values for each argument to each function call inside the specified portion or block of code, may be monitored and stored. The monitoring of the code execution and storing of the type and value information associated with the variables of interest may be performed over a plurality of executions, e.g., whenever this program or program code is executed. Thus, historical run-time execution traces comprising the type and value information may be compiled over multiple executions.

At 210, statistical properties for the variables may be computed, e.g., by the analysis unit. The computation in one embodiment may be performed after the program finishes executing. In another embodiment, the computation may be performed during the execution. Statistical properties may be computed using the historical data as well as the current execution data. Statistical properties may be updated after each execution, for example, over multiple executions.

At 212, future potential types and/or values the variables might take during future executions of the program may be forecasted or predicted, for example, using a prediction algorithm, for example, by a forecasting unit. For instance, the computed statistical properties may be extrapolated to compute future potential values. The predicted values may be also stored.

At 214, variables with anomalous or unusual statistical properties may be searched for, e.g., by a feedback unit, in the stored data. Whether variables have anomalous statistical properties may be determined based on analyzing the current variable values associated with the current program execution compared to those of the previous executions of the same program or similar program (for example, historical data compiled from prior executions). Other benchmark comparison may be performed to determine anomalous statistical properties. Such variables with anomalous statistical properties may be transmitted or reported, e.g., to the monitoring unit, for monitoring during the program execution, e.g., during the next program execution.

At 216, the monitored values may be presented to a user. For instance, at any time during or after execution, a programmer may be enabled to inspect the information via a code editor or the like user interface such as a graphical user interface (GUI), for one or more specified variable, e.g., contained in and/or operated by, the monitoring unit, analysis unit, forecasting unit, and/or feedback unit. Inspection may be performed, for example, by selecting a variable inside a program code presented on a GUI, for instance, by pointing to a variable with the cursor and seeing a tooltip of information.

The programming values associated with one or more of the variables may be presented, e.g., including their averages, medians, and/or modes, for example, using a GUI. A user may also specify window in time, e.g., via a GUI interface's slider or dial for specifying dates, for example past or future dates. Forecasted values and/or averages, medians, and/or modes for the programming values for future runs, e.g., based on trends, may be presented using a GUI interface. A user may specify window in time, e.g., slider or dial for specifying forecasted values. The presentation may includes one or more of tables, lists, graphs, sonification (e.g., mapping of information to sound), presentation in a virtual universe, or any combinations thereof.

An example of a code editor user interface is shown in FIG. 3. FIG. 3 shows example tooltip 302 within a code editor 304 showing variable type and value information for a prior execution of the code. This feature may be used, e.g., even when the code is not actually running. So, e.g., in the process of editing or viewing the code, without actually executing it, a user or programmer may view or otherwise inspect the program variable values. Forecasts of values may also be presented, e.g., displayed.

The programs may be represented and shown in a virtual universe as translucent buildings. For example, subroutines or functions may be represented as rooms, and lines of code may be represented as shelves within the rooms. Variables may be represented as objects (e.g., books) on the shelves. Using this approach, values of variables may be seen (e.g., the size of a virtual object changes size, color, and position relative to an avatar). For instance, in virtual universes, users may be represented by a 3-dimensional (3-D) graphical representation known as an avatar. For example, the developers and testers of code may be represented as humanoid figures. The values of variables may be represented as distances between a graphical representation of the variable (e.g., a colored ball) and the avatar. For example, larger values may cause the ball to be positioned at a greater distance from the avatar than smaller values. As another example, position of the ball relative to the avatar may only change if the value is deemed to be anomalous, such as might be the case if the variable assumed a value far beyond a range of values ever before encountered.

Figure 4:
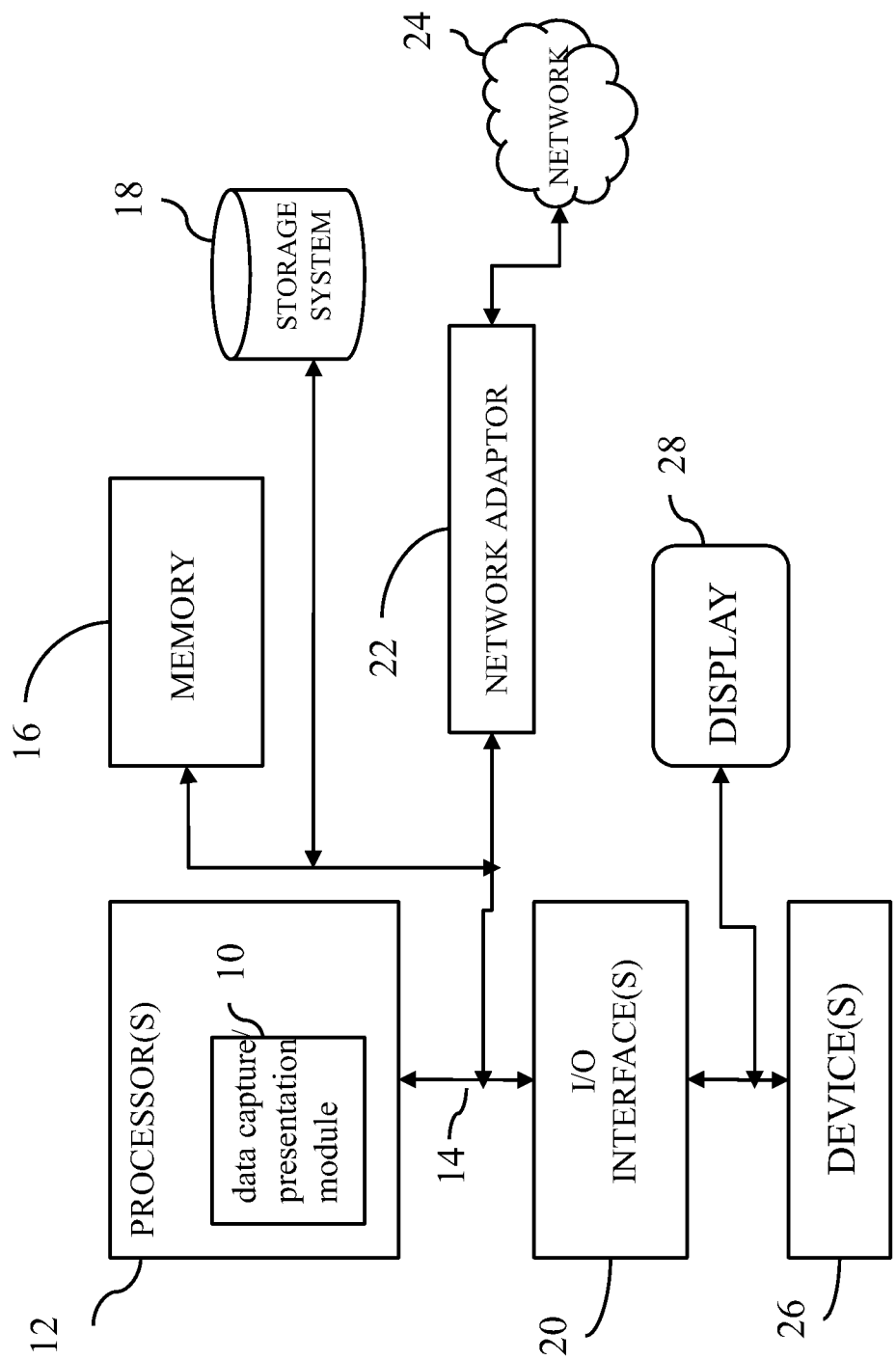
FIG. 4 illustrates a schematic of an example computer or processing system that may implement the system for capturing and presenting historical run-time execution traces in one embodiment of the present disclosure.

FIG. 4 illustrates a schematic of an example computer or processing system that may implement a program variable capture system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 4 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include one or more modules 10 that perform the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages, a scripting language such as Perl, VBS or similar languages, and/or functional languages such as Lisp and ML and logic-oriented languages such as Prolog. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A system for capturing and presenting historical run-time execution traces, comprising:
   a processor;
   a memory connected to the processor;
   a monitoring unit operable to execute on the processor and further operable to obtain an identification of a program code comprising one or more variables whose variable type and value information are to be captured, the monitoring unit further operable to monitor an execution of the program code and modification of the one or more variables occurring in the processor during the execution of the program code, the monitoring unit further operable to monitor one or more types and values for an argument to a function call inside the program code, the monitoring unit further operable to store the variable type and value information the one or more variables take during the execution of the program code by storing in the memory connected to the processor, data structure comprising current state of the variable type value information and updating the data structure by appending the modification with date and time, wherein the monitoring unit, monitors and stores the variable type and value information for a plurality of executions of the program code, wherein the stored variable type and value information for each of the plurality of executions of the program code are compiled as the historical run-time execution traces;
   an analysis unit operable to compute properties for the variables, the properties comprising at least centrality and dispersion values for the variables that are integer variables; and
   forecasting unit operable to forecast future potential variable type and value information the one or more variables will take during a future execution of the program code by extrapolating the computed properties; and
   a code editor user interface operable to execute on the processor, and further operable to present the compiled historical run-time execution traces whether or not the program code is currently executing and without needing the program code to execute while the variable type and value information is being presented.

2. The system of claim 1, further comprising a feedback unit operable to automatically identify one or more variables taking a value outside of an accepted threshold, based on the computed statistical properties, wherein the feedback unit is further operable to automatically communicate the identification of a program code to monitor to the monitoring unit.

3. The system of claim 2, wherein the code editor user interface is further operable to present the computed statistical properties or the forecast of future potential variable type and value information, or combinations thereof, wherein the presenting occurs at least in response to a user hovering an input device over the one or more variables displayed in the code editor user interface.

4. A non-transitory computer readable storage medium storing a program of instructions executable by a machine to perform a method to capture historical run-time execution traces, the method comprising:
   obtaining an identification of a program code comprising one or more variables whose variable type and value information are to be captured;
   monitoring, in a program code editor environment executing on a hardware processor, an execution of the program code and modification of the one or more variables occurring in the processor during the execution of the program code, including monitoring at least types and values for an argument to a function call inside the program code, the monitoring performed automatically by the hardware processor;
   storing the variable type and value information the one or more variables take during the execution of the program code by storing in a memory connected to the hardware processor, data structure comprising current state of the variable type value information and updating the data structure by appending the modification with date and time, wherein the monitoring and the storing are repeated for a plurality of executions of the program code, wherein the stored variable type and value information for each of the plurality of executions of the program code are compiled as the historical run-time execution traces; and presenting one or more of the variable type and value information without needing the program code to execute while the variable type and value information is being presented;

computing properties for the variables, the properties comprising at least centrality and dispersion values for the variables that are integer variables; and forecasting future potential variable type and value information the one or more variables will take during a future execution of the program code by extrapolating the computed properties.

5. The computer readable storage medium of claim 4, further comprising:

presenting one or more of the variable type and value information, the computed statistics, or the computed forecasts, or combination thereof.

6. The computer readable storage medium of claim 5, wherein the presenting is performed during or after the execution of the program code, or combination thereof.

7. The computer readable storage medium of claim 6, wherein the presenting is performed in response to a user selecting said one or more variables from the program code presented via a user interface code editor, and the presenting is performed while the program code is not running.

8. The computer readable storage medium of claim 4, wherein a user is enabled to time-surf across multiple executions of the program code to compare different executions of the program code at different times.

9. The computer readable storage medium of claim 4, wherein the program code editor environment allows a user to specify a window in time for specifying values of the forecasts.

10. The system of claim 1, wherein the code editor user interface is further operable to present a graphical user interface slider for specifying a future date range representing a time window for the forecasting.

* * * * *